(12) United States Patent
Harmon et al.

(10) Patent No.: US 12,528,328 B2
(45) Date of Patent: Jan. 20, 2026

(54) HEATING, VENTILATION, AND AIR CONDITIONING UNIT FOR A VEHICLE

(71) Applicant: Ford Global Technologies, LLC, Dearborn, MI (US)

(72) Inventors: Michael John Harmon, Northville, MI (US); Hussain Zoher Tajmahal, Detroit, MI (US); Marielle Beverly Conrad, Detroit, MI (US); Yejin Han, Detroit, MI (US); David Earl Ooms, Canton, MI (US); Michael Moliterno, Chicago, IL (US); Andrew Smith, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 258 days.

(21) Appl. No.: 18/360,902

(22) Filed: Jul. 28, 2023

(65) Prior Publication Data

US 2023/0364965 A1 Nov. 16, 2023

Related U.S. Application Data

(63) Continuation of application No. 17/195,846, filed on Mar. 9, 2021, now Pat. No. 11,752,828.

(51) Int. Cl.
*B60H 1/00* (2006.01)
(52) U.S. Cl.
CPC ..... *B60H 1/00285* (2013.01); *B60H 1/00207* (2013.01); *B60H 1/00278* (2013.01); *B60H 1/00485* (2013.01); *B60H 1/00564* (2013.01); *B60H 2001/00221* (2013.01)

(58) Field of Classification Search
CPC ............ B60H 1/00285; B60H 1/00207; B60H 1/00278; B60H 1/00485; B60H 1/00564; B60H 2001/00221; B60H 1/246; B60H 1/00271
USPC ......................................................... 454/120
See application file for complete search history.

(56) References Cited

U.S. PATENT DOCUMENTS

| | | |
|---|---|---|
| 5,791,156 A | 8/1998 | Strautman et al. |
| 6,295,826 B1 | 10/2001 | Lee |
| 6,780,097 B2 | 8/2004 | Shuttleworth et al. |
| 6,868,900 B2 | 3/2005 | Dage et al. |
| 7,334,834 B2 | 2/2008 | Hill et al. |

(Continued)

FOREIGN PATENT DOCUMENTS

| | | |
|---|---|---|
| JP | 2004331024 A | 11/2004 |
| KR | 20100030740 A | 3/2010 |

*Primary Examiner* — Avinash A Savani
*Assistant Examiner* — Ryan L Faulkner
(74) *Attorney, Agent, or Firm* — Vichit Chea; Price Heneveld LLP

(57) ABSTRACT

A vehicle heating, ventilation, and air conditioning unit includes a seating assembly that has a seat air duct assembly disposed within an interior of the seating assembly. A heating, ventilation, and air conditioning assembly includes a housing having a first surface and a second surface. The seating assembly is disposed on the first surface of the housing. A seat-directed duct is disposed within the housing. The seat-directed duct is in fluid communication with the seat air duct assembly and an intake defined by the housing. A condenser is disposed within the housing proximate to the intake and an evaporator is disposed within the housing proximate to an inlet of the seat-directed duct.

19 Claims, 15 Drawing Sheets

(56) References Cited

U.S. PATENT DOCUMENTS

| | | |
|---|---|---|
| 10,173,561 B2 | 1/2019 | Cho et al. |
| 10,266,031 B2 | 4/2019 | Steinman et al. |
| 2002/0063451 A1 | 5/2002 | Bergheer et al. |
| 2003/0168267 A1 | 9/2003 | Borroni-Bird et al. |
| 2009/0229785 A1* | 9/2009 | Kadle .................. B60N 2/5628 297/180.12 |
| 2009/0317187 A1* | 12/2009 | Bohme .............. B62D 33/0633 404/90 |
| 2009/0318069 A1 | 12/2009 | Konet |
| 2013/0207420 A1 | 8/2013 | Kumar et al. |
| 2016/0272038 A1* | 9/2016 | Tanaka ..................... B60N 2/56 |
| 2017/0043694 A1* | 2/2017 | Tanaka ............... B60H 1/00285 |
| 2018/0272835 A1 | 9/2018 | Fujii et al. |
| 2019/0047449 A1* | 2/2019 | Fujii .................... B60N 2/5657 |
| 2020/0122614 A1* | 4/2020 | Kawano ............ B60H 1/00285 |

* cited by examiner

HEATING, VENTILATION, AND AIR CONDITIONING UNIT FOR A VEHICLE

CROSS-REFERENCE TO RELATED APPLICATION

This application is a continuation of U.S. patent application Ser. No. 17/195,846 filed Mar. 9, 2021, now U.S. Pat. No. 11,752,828, entitled "HEATING, VENTILATION, AND AIR CONDITIONING UNIT FOR A VEHICLE." The aforementioned related application is hereby incorporated by reference.

FIELD OF THE DISCLOSURE

The present disclosure generally relates to a heating, ventilation, and air conditioning (HVAC) unit. More specifically, the present disclosure relates to an HVAC unit for a vehicle.

BACKGROUND OF THE DISCLOSURE

Vehicles may include an HVAC system for treating air that is directed into a passenger cabin of the vehicle. The HVAC system generally directs air from external to the vehicle and expels the air into the passenger cabin after treating the air. The HVAC system may also recirculate air from the passenger cabin to the passenger cabin after treating the air.

SUMMARY OF THE DISCLOSURE

According to at least one aspect of the present disclosure, a vehicle heating, ventilation, and air conditioning unit includes a seating assembly that has a seat air duct assembly disposed within an interior of the seating assembly. A heating, ventilation, and air conditioning assembly includes a housing having a first surface and a second surface. The seating assembly is disposed on the first surface of the housing. A seat-directed duct is disposed within the housing. The seat-directed duct is in fluid communication with the seat air duct assembly and an intake defined by the housing. A condenser is disposed within the housing proximate to the intake and an evaporator is disposed within the housing proximate to an inlet of the seat-directed duct.

According to another aspect of the present disclosure, a heating, ventilation, and air conditioning unit for a vehicle includes a heating, ventilation, and air conditioning assembly that has a housing defining an intake. The housing has a first surface and a second surface opposing the first surface. A floor duct assembly is disposed within the housing. The floor duct assembly includes at least one seat-directed duct. A blower motor is disposed proximate to an inlet of the at least one seat-directed duct. The blower motor is configured to direct air through the inlet. At least one seating assembly is operably coupled to the first surface of the housing. The at least one seating assembly defines at least one air vent. The at least one seating assembly includes a seat air duct assembly in fluid communication with the floor duct assembly to direct air through the at least air vent.

According to another aspect of the present disclosure, a heating, ventilation, and air conditioning assembly for a vehicle includes a housing that defines an interior. The housing defines an intake fluidly coupled with the interior. The housing defines a first vent opening on a first surface thereof and a second vent opening on a second surface thereof. A floor duct assembly is disposed within the interior of the housing. The floor duct assembly includes a battery-directed duct in fluid communication with the intake and the first vent opening. The battery-directed duct is configured to direct air toward a battery. A seat-directed duct is in fluid communication with the intake and the second vent opening. The seat-directed duct is configured to direct air toward a seating assembly.

These and other aspects, objects, and features of the present disclosure will be understood and appreciated by those skilled in the art upon studying the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings.

DETAILED DESCRIPTION

Additional features and advantages of the presently disclosed device will be set forth in the detailed description which follows and will be apparent to those skilled in the art from the description or recognized by practicing the device as described in the following description, together with the claims and appended drawings.

Figure 1:
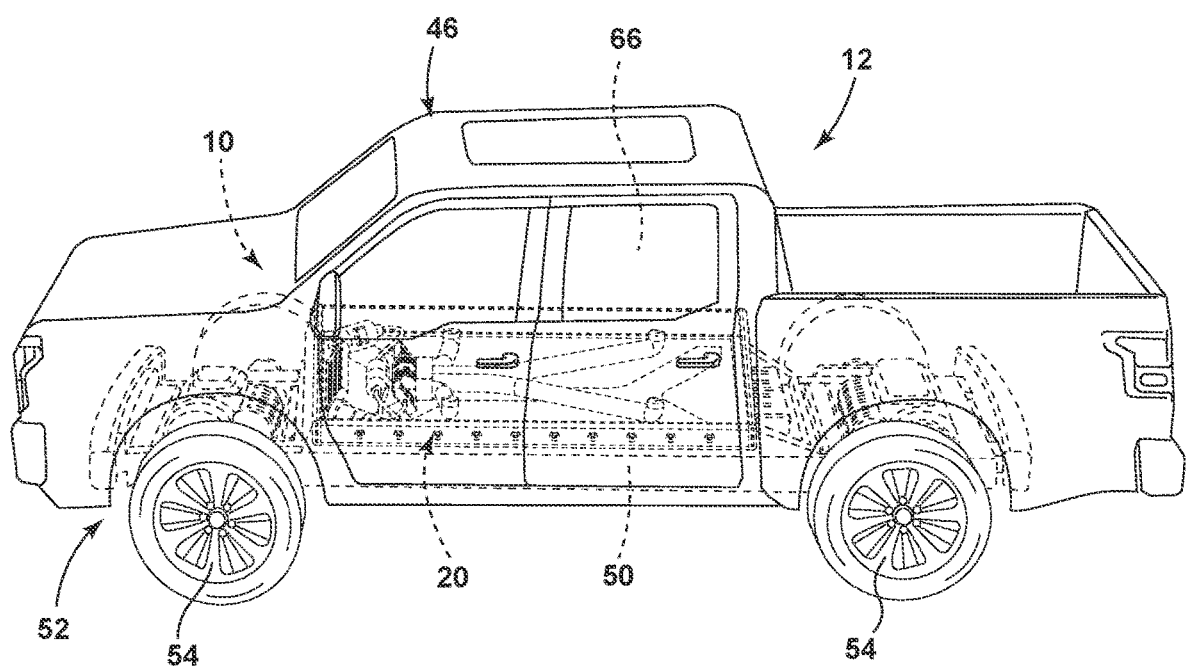
FIG. 1 is a side perspective view of a vehicle with an HVAC assembly included in a support assembly, according to the present disclosure.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Referring to FIGS. 1-14, reference numeral 10 generally designates a heating, ventilation, and air conditioning (HVAC) unit for a vehicle 12, which includes a seating assembly 14 that has a seat air duct assembly 16 disposed within an interior 18 of the seating assembly 14. An HVAC assembly 20 includes a housing 22 that has a first surface 24 and a second surface 26. The seating assembly 14 is disposed on the first surface 24 of the housing 22. A seat-directed duct 28 is disposed within the housing 22. The seat-directed duct 28 is in fluid communication with the seat air duct assembly 16 and an intake 30 defined by the housing 22. A condenser 32 is disposed within the housing 22 proximate to the intake 30. An evaporator 34 is disposed within the housing 22 proximate to an inlet 36 of the seat-directed duct 28.

Figure 2:
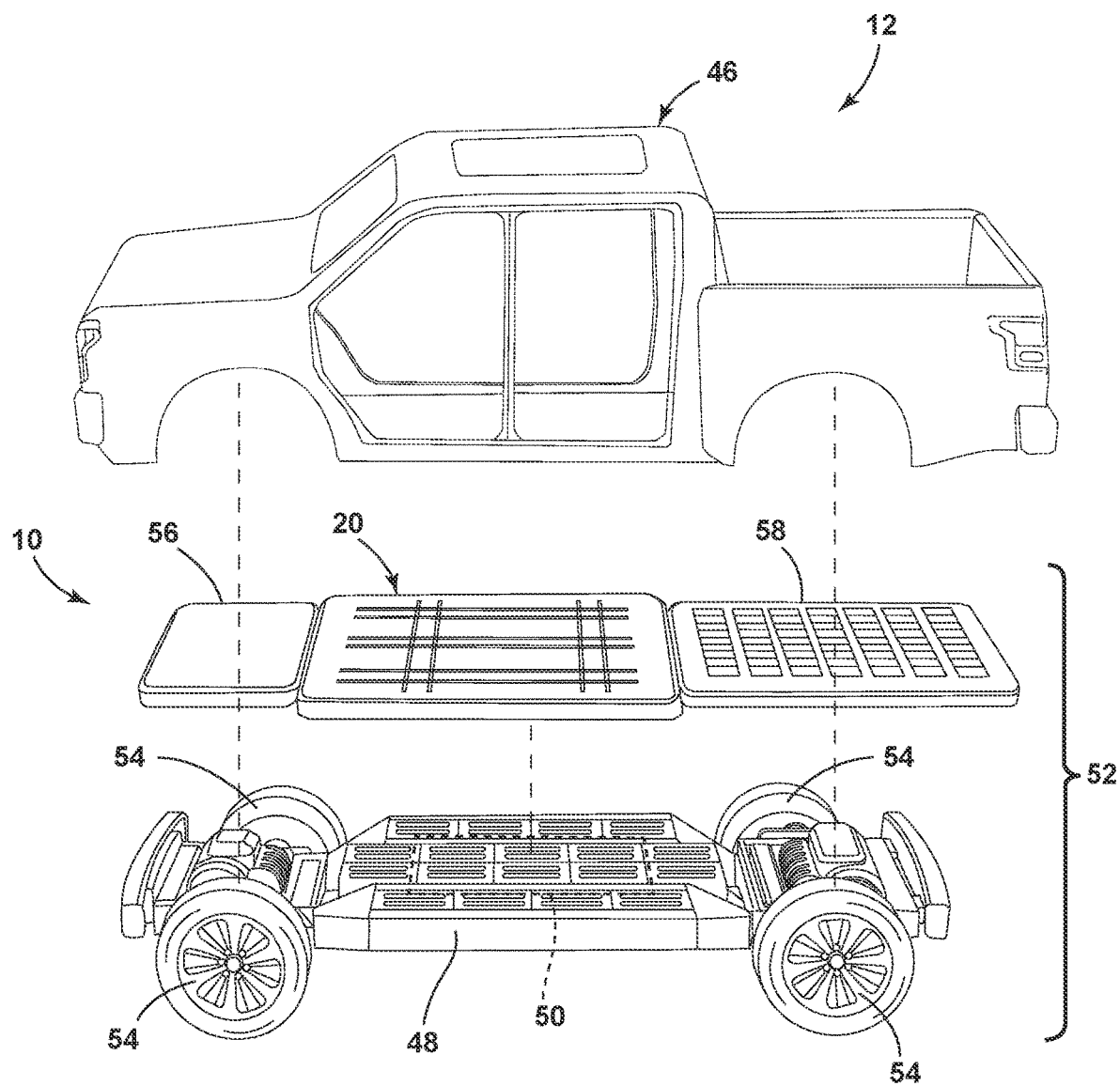
FIG. 2 is an exploded view of a vehicle with a vehicle body, an HVAC assembly, and a battery platform, according to the present disclosure.
Figure 5:
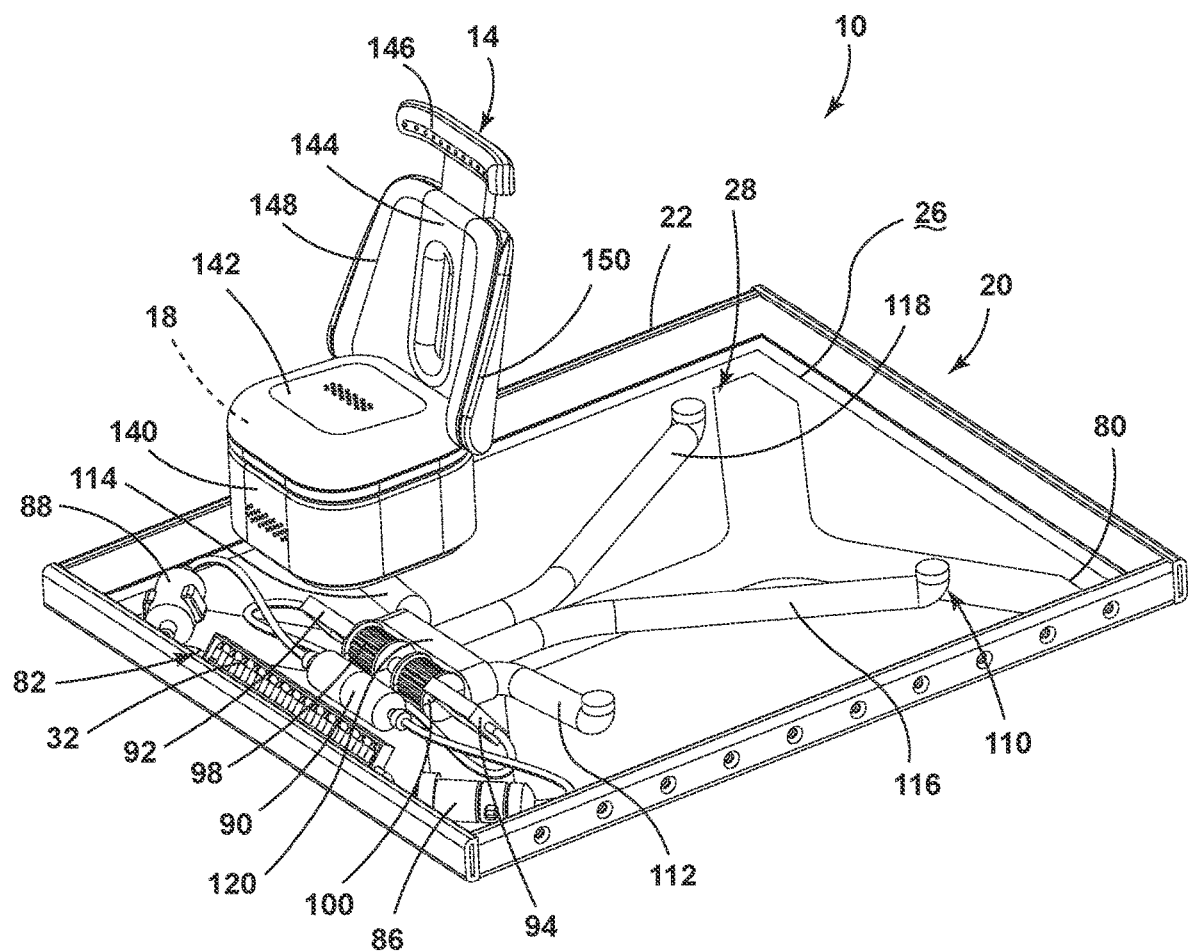
FIG. 5 is a side perspective of an HVAC unit including a seating assembly disposed on an HVAC assembly, with an upper surface of the HVAC assembly removed, according to the present disclosure.

Referring to FIGS. 1 and 2, the vehicle 12 generally includes a vehicle body 46, the HVAC assembly 20, and a platform 48. Generally, the platform 48 houses a battery 50 when the vehicle 12 is configured as a battery electric vehicle (BEV) 12. Additionally, the platform 48 and the HVAC assembly 20 form a base support assembly 52 for the vehicle 12, which supports the vehicle body 46 and the seating assembly 14 (FIG. 5). Wheels 54 are coupled to the platform 48, which also generally includes a drive unit. The HVAC assembly 20 is disposed on the platform 48 between additional support features 56, 58. The vehicle body 46 is coupled to the platform 48 over the HVAC assembly 20 and the support features 56, 58.

The vehicle 12 is illustrated as a truck; however, the vehicle 12 may be a sedan, a sport utility vehicle, a van, a crossover, other wheeled motor vehicles 12, or other styles or types of vehicles 12. The vehicle 12 may be a manually operated vehicle 12 (e.g., operated with the human driver), a fully autonomous vehicle 12 (e.g., operated without a human driver), or a partially autonomous vehicle 12 (e.g., operated with or without a human driver). Additionally, the vehicle 12 may be utilized for personal or commercial purposes, such as, for transporting, ride-providing services (e.g., chauffeuring), or ride-sharing services. Further, the vehicle 12 may be an electric vehicle 12, such as the BEV, or have an internal combustion engine.

The vehicle body 46 and the HVAC assembly 20 cooperate to substantially form an interior compartment 66 of the vehicle 12. The vehicle body 46 generally includes four sides including a front, two lateral sides, and a top. A bottom of the vehicle body 46 is open and the HVAC assembly 20 and the support features 56, 58 operate to close the bottom of the vehicle body 46 to enclose the interior compartment 66.

Figure 3A:
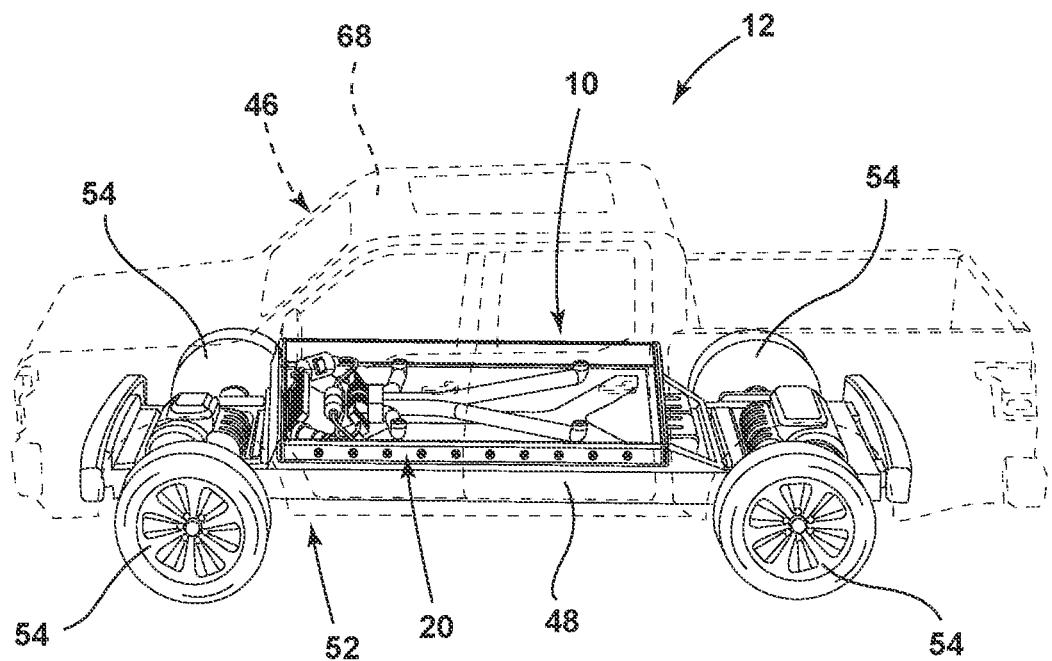
FIG. 3A is a side perspective view of a vehicle that includes an HVAC assembly, a battery platform, and a truck body, which is illustrated in phantom, according to the present disclosure.
Figure 3B:
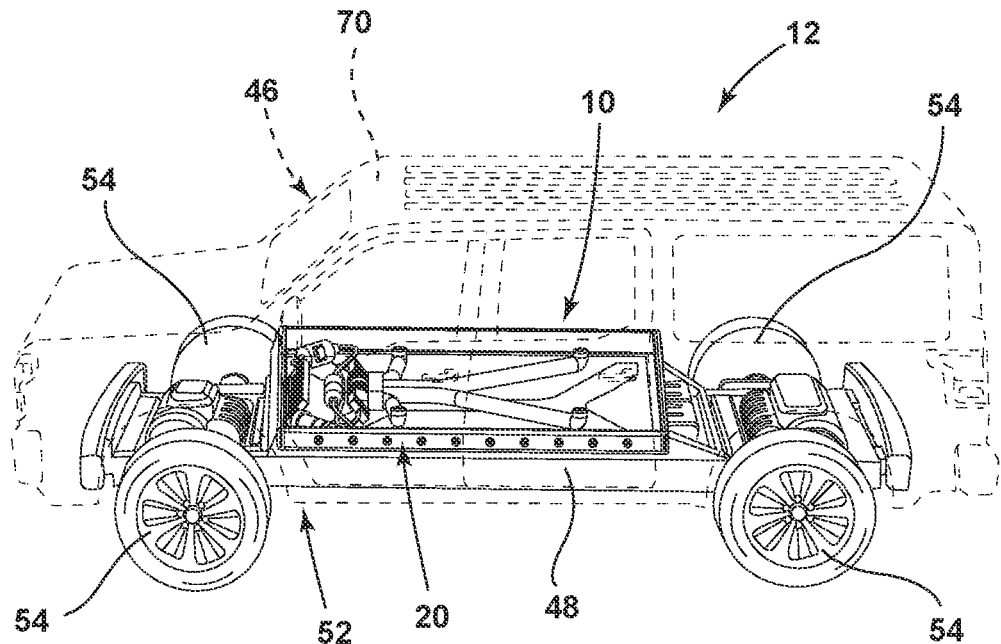
FIG. 3B is a side perspective view of a vehicle that includes an HVAC assembly, a battery platform, and a van body, which is illustrated in phantom, according to the present disclosure.

Referring to FIGS. 3A and 3B, the platform 48, the HVAC assembly 20, and the support features 56, 58 may be utilized with various configurations of the vehicle body 46. For example, as illustrated in FIG. 3A, the vehicle body 46 is configured as a truck body 68. In FIG. 3B, the vehicle body 46 is configured as a van body 70. The platform 48 and the HVAC assembly 20 may remain substantially similar and be utilized with various configurations of the vehicle body 46, including, but not limited to the truck body 68 and the van body 70. The various vehicle bodies 46 may have common attachment points to engage the HVAC assembly 20 and the platform 48. Accordingly, the HVAC assembly 20 may be interchangeably utilized with multiple styles of vehicles 12 and platforms 48.

Figure 4:
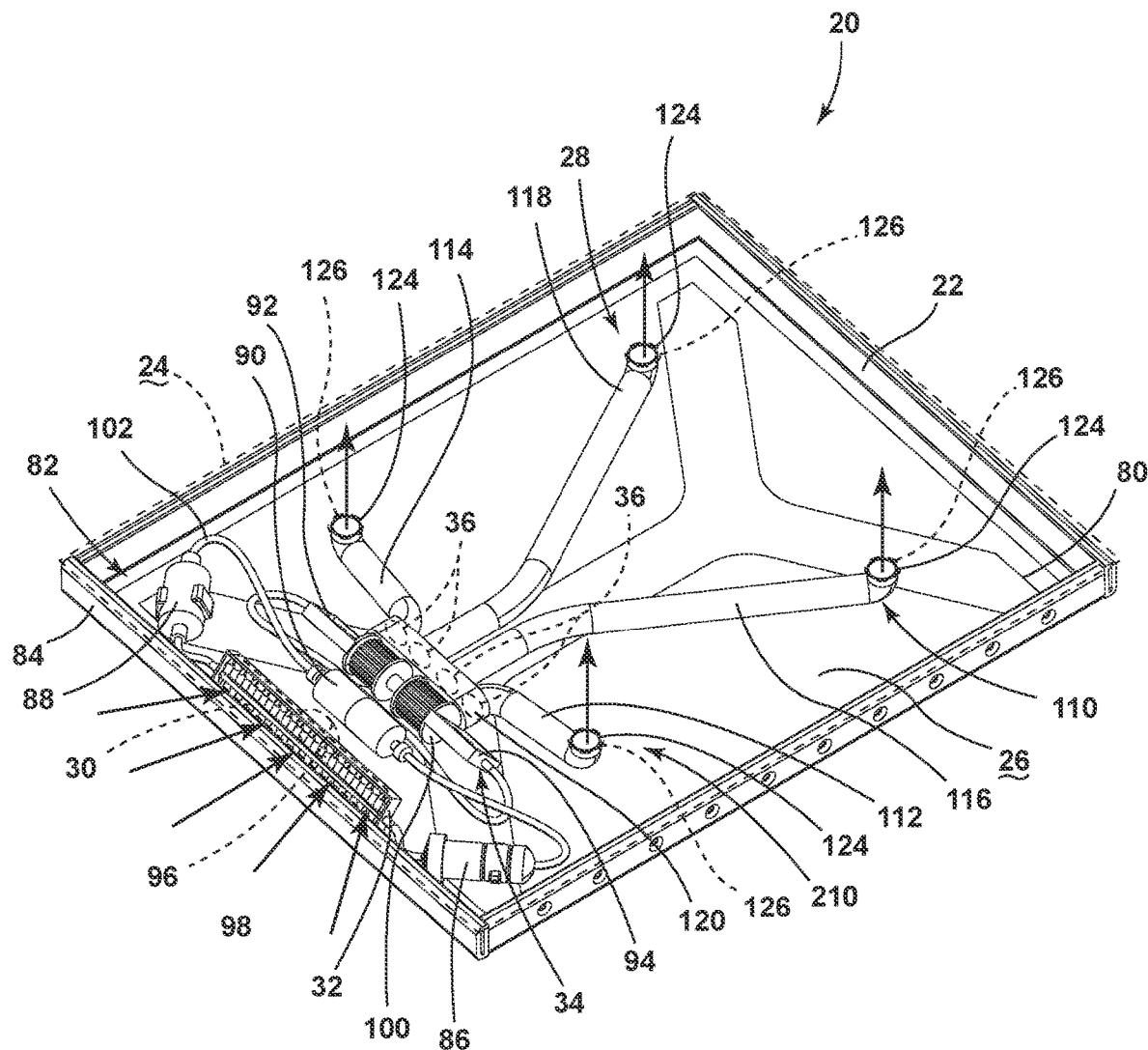
FIG. 4 is a top perspective view of an HVAC assembly for a vehicle with an upper surface in phantom, according to the present disclosure.

Referring to FIG. 4, the HVAC assembly 20 includes the housing 22 having the first surface 24 and the second, opposing surface 26. Generally, the first surface 24 is an upper surface oriented toward the interior compartment 66. The second surface 26 is a lower surface oriented toward the platform 48.

The housing 22 defines an interior 80 for housing an HVAC system 82 for treating air drawn in through the intake 30. The housing 22 defines the intake 30 on a side 84 of the housing 22, which may generally be a vehicle-forward side of the HVAC assembly 20. Air from an area external to the vehicle 12 travels through the intake 30 to be treated by the HVAC system 82 within HVAC assembly 20. Accordingly, the interior 80 of the housing 22 is in fluid communication with the intake 30 for directing air through the HVAC system 82.

Generally, the HVAC system 82 cleans, cools, heats, regulates, ventilates, and/or dehumidifies air. Air enters through the intake 30, is processed by the HVAC system 82, and is expelled from the HVAC assembly 20. The area in which the HVAC system 82 expels the air depends on the configuration of the HVAC assembly 20. In the illustrated example of FIG. 4, the HVAC assembly 20 expels the air, through the first surface 24, and toward the interior compartment 66.

Referring still to FIG. 4, the HVAC system 82 generally includes the condenser 32, a compressor 86, a drier 88, an expansion valve 90, and evaporators 92, 94 (which may collectively be referred to as the evaporators 34). The HVAC system 82 also generally includes a condenser fan 96 and blower motors 98, 100. The compressor 86 generally compresses a refrigerant into a heated vapor, thereby putting the HVAC system 82 into a high-pressure state. The pressure forces the liquid out of the compressor 86 through tubing 102 throughout the HVAC system 82. The compressor 86 is disposed within the interior 80 of the housing 22 proximate to the condenser 32.

The condenser 32 is positioned adjacent to the intake 30. The refrigerant travels from the compressor 86 to the condenser 32, where the refrigerant is cooled by air passing over the condenser 32. Generally, the refrigerant changes to a liquid as the refrigerant travels through the condenser 32. The condenser fan 96 is disposed proximate to the condenser 32 and operates to cool the condenser 32.

The refrigerant then moves to the drier 88, which is disposed on an opposing side of the condenser 32 relative to the compressor 86. The drier 88 generally operates to remove moisture from the HVAC system 82. Further, the drier 88 may include a filter that can trap contaminants that may be inside the HVAC system 82.

The cooled refrigerant moves from the drier 88 to the expansion valve 90. The expansion valve 90 generally creates a pressure drop. The expansion valve 90 operates to turn refrigerant into a gaseous form or a mist. The expansion valve 90 is generally disposed proximate to the condenser 32 and between the compressor 86 and the drier 88.

Referring still to FIG. 4, the two evaporators 92, 94 are disposed proximate to the expansion valve 90. The refrigerant travels from the expansion valve 90 through at least one of the evaporators 92, 94 in the gaseous or mist state to absorb heat from the air that is moving through the evaporators 92, 94, respectively. Generally, after traveling through the evaporators 92, 94, the refrigerant then returns to the compressor 86 to again be compressed. The blower motors 98, 100 are disposed adjacent to the expansion valve 90 between the evaporators 92, 94. The blower motors 98, 100 operate to push the air across the evaporators 92, 94.

As previously stated, the condenser 32 is disposed proximate to the intake 30 of the housing 22. Generally, the air travels through the intake 30 and passes over the condenser 32, thereby removing heat from the condenser 32. The air then travels through the interior 80 of the housing 22. The blower motors 98, 100 operate to draw the air from the intake 30. Additionally or alternatively, the blower motors 98, 100 push the air across the cooled tubes of the evaporators 92, 94 to deliver cooled air into a floor duct assembly 110. The air travels through the floor duct assembly 110 and is expelled from the HVAC assembly 20.

The floor duct assembly 110 is disposed within the interior 80 of the housing 22. The floor duct assembly 110 directs the air treated by the HVAC system 82 to different locations. The floor duct assembly 110 includes a first seat-directed duct 112, second seat-directed duct 114, a third seat-directed duct 116, and a fourth seat-directed duct 118, which may collectively be referred to as the seat-directed ducts 28.

Each of the seat-directed ducts 28 is coupled to a duct connector 120 and extends to a different location within the housing 22. The duct connector 120 is generally hollow and directs air from the HVAC system 82 to the floor duct assembly 110. The duct connector 120 is disposed within the interior 80 of the housing 22 proximate to the blower motors 98, 100. The inlet 36 of each seat-directed duct 28 is in fluid communication with the duct connector 120. Accordingly, air may be directed through the duct connector 120 and through the inlet 36 of each seat-directed duct 28.

Generally, the first seat-directed duct 112 is a mirror image of the second seat-directed duct 114, while the third seat-directed duct 116 is a mirror image of the fourth seat-directed duct 118. The first and second seat-directed ducts 112, 114 are shorter in length than third and fourth seat-directed ducts 116, 118. The first and second seat-directed ducts 112, 114 extend from the duct connector 120 and in opposing directions relative to one another. The third and fourth seat-directed ducts 116, 118 are coupled to the duct connector 120 between the first and second seat-directed ducts 112, 114. The third and fourth seat-directed ducts 116, 118 extend in a vehicle-rearward direction within the interior 80 of the housing 22 and outward in opposing directions relative to one another.

Each of the seat-directed duct 28 defines an outlet 124 that expels air upwards through the first surface 24 of the housing 22. The housing 22 define vent openings 126 within the first surface 24. The outlets 124 align with the vent openings 126 to expel air through the housing 22 and out of the HVAC assembly 20. The vent openings 126 are spaced apart on the first surface 24, directing air to different locations over the HVAC assembly 20.

Referring to FIG. 5, the seating assembly 14 is disposed on the first surface 24 of the housing 22. The seating assembly 14 includes a base support 140 operably coupled to the housing 22. A seat base 142 is coupled to the base support 140 to provide a location for the passenger to sit. A seatback 144 is coupled to the seat base 142, and a headrest 146 is coupled to the seatback 144. Generally, the seatback 144 has bolsters 148, 150 to provide arm support to the passenger seated on the seating assembly 14.

Figure 6:
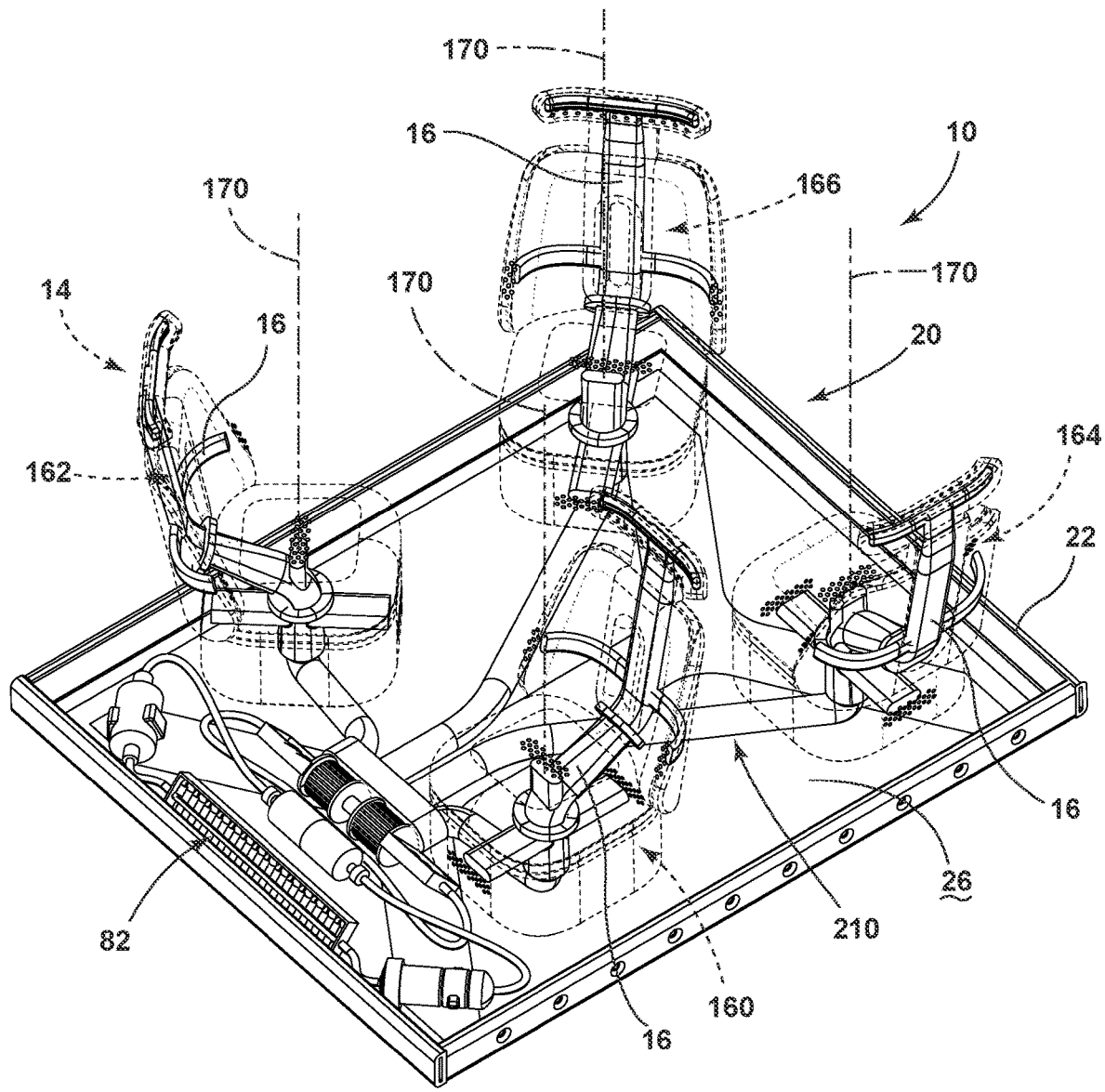
FIG. 6 is a top perspective view of an HVAC unit including seating assemblies disposed on an HVAC assembly, with an upper surface of the HVAC assembly removed, according to the present disclosure.

Referring still to FIG. 5, as well as FIG. 6, the vehicle 12 in the illustrated example includes four seating assemblies 160, 162, 164, 166, which may collectively be referred to as the seating assemblies 14. The first and second seating assemblies 160, 162 are arranged in a first, vehicle-forward seating row and the third and fourth seating assemblies 164, 166 are arranged in a second, vehicle-rearward seating row.

The seat-directed ducts 28 each extend to a corresponding seating assembly 14. For example, the first seat-directed duct 112 is in fluid communication with the seating assembly 160, and the second seat-directed duct 114 is in fluid communication with the seating assembly 162. Additionally, the third seat-directed duct 116 is in fluid communication with the seating assembly 164, and the fourth seat-directed duct 118 is in fluid communication with the seating assembly 166. Each seating assembly 14 is disposed over one vent opening 126 defined by the housing 22, such that air may be directed from respective seat-directed duct 28 of the floor duct assembly 110 and into the interior 18 of the seating assembly 14, respectively. Additionally or alternatively, the floor duct assembly 110 is coupled with the seat air duct assembly 16 disposed within the interior 18 of each of the seating assemblies 14 to provide airflow to the passengers on the seating assemblies 14, as discussed further herein.

Each seating assembly 14 is configured to rotate about a respective rotational axis 170. Each seating assembly 14 is configured to rotate about 360° about the rotational axis 170. The seat air duct assembly 16 rotates with the seating assembly 14 to provide a similar airflow experience as the seating assembly 14 rotates between different positions relative to the HVAC assembly 20. The seating assemblies 14 may be oriented in any direction relative to the HVAC assembly 20, and consequently the vehicle 12, and experience a substantially similar airflow experience.

Figure 7:
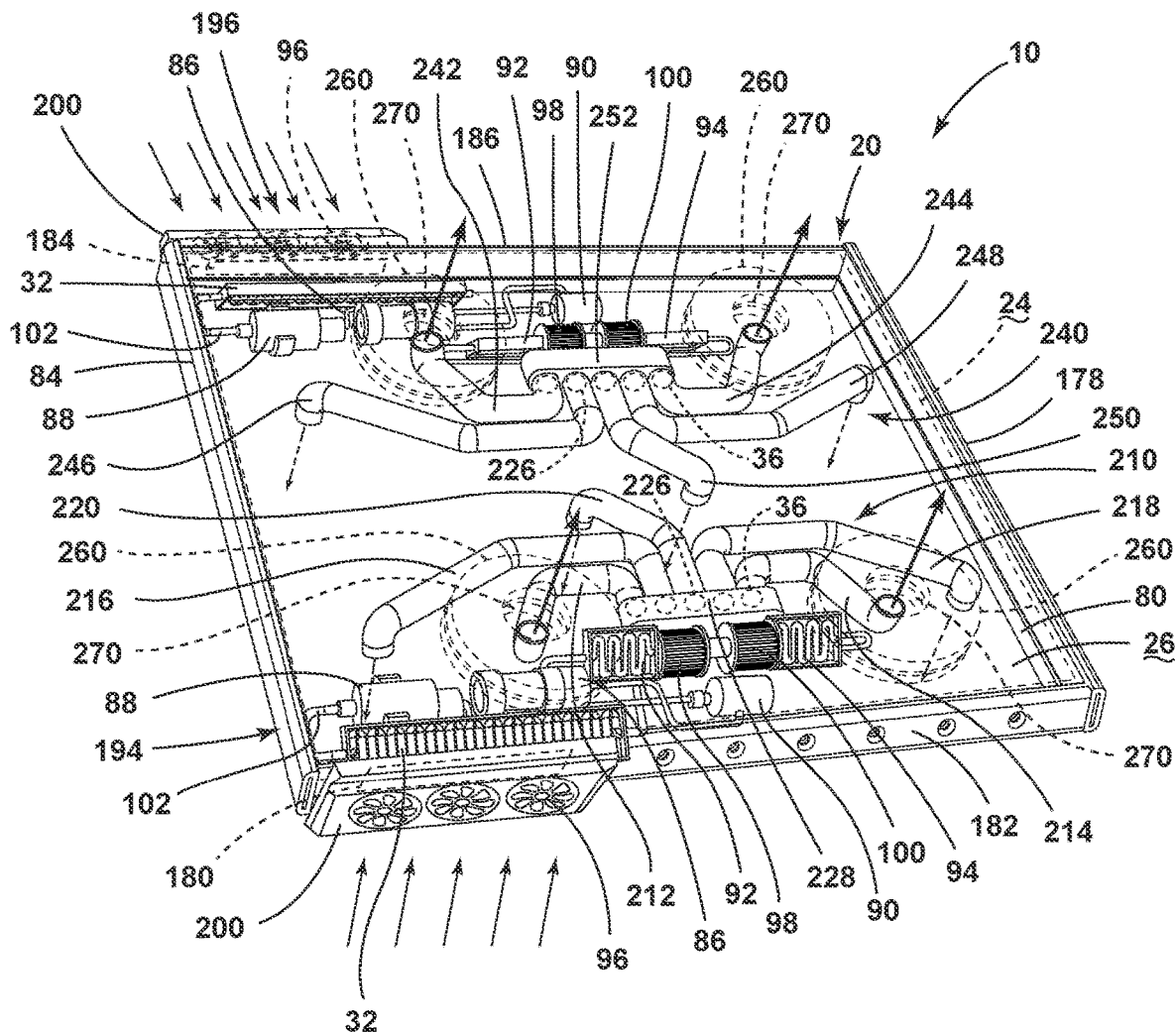
FIG. 7 is a top perspective view of an HVAC assembly for a vehicle with two HVAC system, with an upper surface of the HVAC assembly in phantom, according to the present disclosure.
Figure 8:
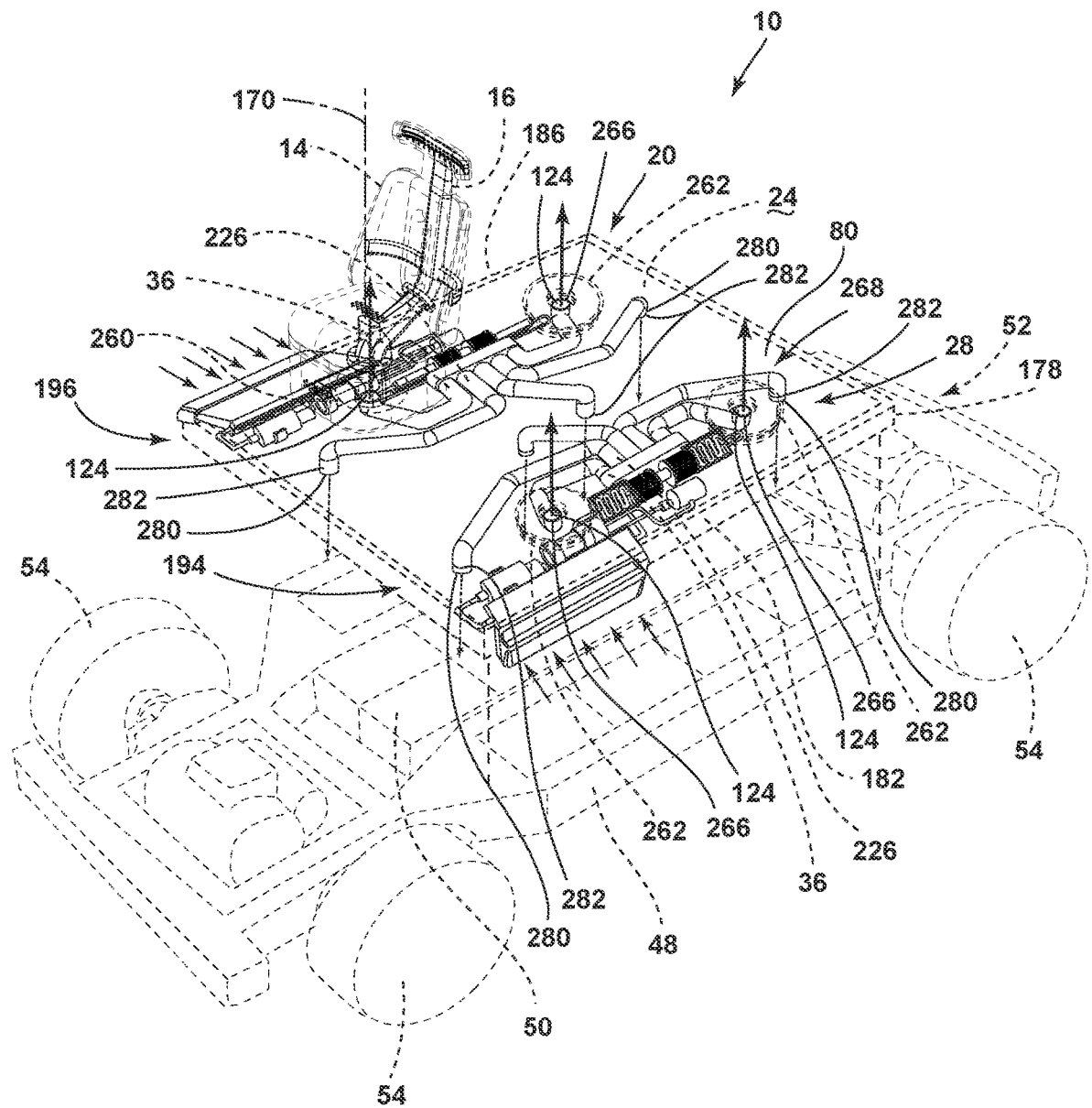
FIG. 8 is an exploded view of a support assembly for a vehicle including a battery platform and an HVAC unit with a seating assembly disposed on the battery platform, according to the present disclosure.

Referring to FIG. 7, an additional or alternative configuration of the HVAC unit 10 with an additional or alternative HVAC assembly 20 is illustrated. In the illustrated example, the HVAC assembly 20 has a dual system for treating and expelling air. The HVAC assembly 20 includes a housing 178 that defines a first intake 180 on a first side 182 thereof and a second intake 184 on the second, opposing side 186 thereof. The first and second intakes 180, 184 are generally disposed proximate to front wheels 54 of the vehicle 12, as best illustrated in FIG. 8. The housing 178, similar to the housing 22, is configured to be disposed on the platform 48 as part of the base support assembly 52 (FIG. 8).

The HVAC assembly 20 includes an HVAC system 194 associated with the first intake 180 and an HVAC system 196 associated with the second intake 184. Each HVAC system 194, 196 includes the condenser 32, the compressor 86, the drier 88, the expansion valve 90, and the evaporators 92, 94. Additionally, each HVAC system 194, 196 includes the condenser fan 96 disposed proximate to the condenser 32 and the blower motors 98, 100. A cover 200 is coupled to the housing 178 proximate to each of the first intake 180 and the second intake 184 for guiding airflow into the housing 178, while substantially preventing debris from entering the housing 178.

For the HVAC system 194, the condenser 32 is disposed proximate to the first intake 180. The condenser fan 96 is disposed proximate to the condenser 32 for cooling the condenser 32. The compressor 86 and the drier 88 are disposed proximate to the condenser 32. The expansion valve 90 is disposed proximate to compressor 86 and the blower motors 98, 100. The blower motors 98, 100 are disposed between the evaporators 92, 94. The HVAC system 194 is generally disposed proximate to the first side 182 of the housing 178. The HVAC system 194 operates in a similar manner as the HVAC system 82 described herein.

Referring still to FIG. 7, the HVAC system 194 is in fluid communication with a first floor duct assembly 210. The first floor duct assembly 210 includes two seat-directed ducts 212, 214 and three battery-directed ducts 216, 218, 220. The inlet 36 of each seat-directed duct 212, 214 and an inlet 226 of each battery-directed duct 216, 218, 220 are disposed proximate to one another and the blower motors 98, 100. Generally, each seat-directed duct 212, 214 and each battery-directed duct 216, 218, 220 is coupled to a duct connector 228, which fluidly couples the HVAC system 194 with the first floor duct assembly 210. The three battery-directed ducts 216, 218, 220 are generally disposed between the two seat-directed ducts 212, 214 adjacent to the duct connector 228. The blower motors 98, 100 operate to push air over the evaporators 92, 94, and through the inlets 36, 226 of the first floor duct assembly 210.

The seat-directed duct 212 is generally a mirror image of the seat-directed duct 214. The seat-directed duct 212 extends from the duct connector 228 in a vehicle-forward direction, and the seat-directed duct 214 extends from the duct connector 228 in a vehicle-rearward direction. The battery-directed duct 216 is generally a mirror image of the battery-directed duct 218. The battery-directed duct 216 extends from the duct connector 228 in a vehicle-forward direction, and the battery-directed duct 218 extends from the duct connector 228 in a vehicle-rearward direction. Each of the battery-directed duct 216 and the battery-directed duct 218 extend greater distances than the seat-directed ducts 212, 214, respectively. The battery-directed duct 220 extends from the duct connector 228 toward a central location within the housing 178. The battery-directed duct 218 extends in a vehicle-forward direction but does not extend as far in the vehicle-forward direction as the seat-directed duct 212. Each duct of the floor duct assembly 210 extends to a different location on the first side 182 of the housing 178.

Referring still to FIG. 7, the HVAC system 196 is associated with the second intake 184 on the second side 186 of the housing 178. The HVAC system 196 includes the condenser 32 disposed proximate to the second intake 184. Air travels through the second intake 184, over the condenser 32, and toward the blower motors 98, 100. The blower motors 98, 100 push air over the evaporators 92, 94 to direct air into a second floor duct assembly 240.

The second floor duct assembly 240 includes two seat-directed ducts 242, 244 and three battery-directed ducts 246, 248, 250. The seat-directed ducts 242, 244 and the battery-directed ducts 246, 248, 250 are each coupled to a duct connector 252. The inlet 36 of each seat-directed duct 242, 244 and the inlet 226 of each battery-directed duct 246, 248, 250 are disposed proximate to the blower motors 98, 100 to receive air processed by the HVAC system 196. The seat-directed duct 242 is generally a mirror image of the seat-directed duct 244. The seat-directed duct 242 extends from the duct connector 252 in a vehicle-forward direction, and the seat-directed duct 244 extends from the duct connector in the vehicle-rearward direction.

The battery-directed duct 246 is generally a mirror image of the battery-directed duct 248. The battery-directed duct 246 extends from the duct connector 252 in a vehicle-forward direction, and the battery-directed duct 248 extends from the duct connector 252 in a vehicle-rearward direction. Each of the battery-directed duct 246 and the battery-directed duct 248 extend greater distances than the seat-directed ducts 242, 244, respectively. The battery-directed duct 250 extends from the duct connector 252 toward a central location within the housing 178. The battery-directed duct 250 extends in a vehicle-rearward direction but does not extend as far in the vehicle-rearward direction as the seat-directed duct 244. Each duct of the second floor duct assembly 240 extends to a different location on the second side 186 of the housing 178.

Generally, the HVAC system 194 is a mirror image of the HVAC system 196. Additionally or alternatively, the seat-directed ducts 212, 214 of the first floor duct assembly 210 are mirror images of the seat-directed ducts 242, 244 of the second floor duct assembly 240. Further, the battery-directed ducts 216, 218 are mirror images of the battery-directed ducts 246, 248.

Referring still to FIG. 7, as well as FIG. 8, the HVAC assembly 20 generally includes a rotation support 260 coupled to each seating assembly 14. Each rotation support 260 may be disposed partially within the interior 80 of the housing 178 and partially on the first surface 24 of the housing 178. The first surface 24 of the housing 178 defines grooves 262 for accommodating each rotation support 260. The rotation supports 260 allow the seating assemblies 14 to rotate about the respective rotational axis 170.

The HVAC assembly 20 includes the two floor duct assemblies 210, 240 for directing air to multiple locations and in multiple directions relative to the housing 178. The HVAC assembly 20 includes the seat-directed ducts 212, 214, 242, 244, which may generally be referred to as the seat-directed ducts 28. The HVAC assembly 20 also includes the battery-directed ducts 216, 218, 220 and the battery-directed ducts 246, 248, 250, which may generally be referred to as battery-directed ducts 268.

The first surface 24 of the housing 178 defines vent openings 266. Generally, the outlet 124 of each seat-directed duct 28 aligns with one of the vent openings 266. In this way, the seat-directed ducts 28 direct air through the vent openings 266 defined in the first surface 24 of the housing 178. Each rotation support 260 includes a hollow center 270 that aligns with one of the vent openings 266, respectively. The seat ducts 28 may extend at least partially through the hollow center 270 of the respective rotation support 260 to direct air through the vent opening 266.

Referring still to FIGS. 7 and 8, the housing 178 defines vent openings 280 in the second surface 26 of the housing 178. The vent openings 280 generally align with outlets 282 of the battery-directed ducts 268. The battery-directed ducts 268 direct air through the second surface 26 of the housing 178. In the illustrated example of FIG. 8, the housing 178 is disposed on the platform 48 over the battery 50. The battery-directed ducts 268 direct air toward the battery 50 housed in the platform 48. The air directed toward the battery 50 operates to cool the battery 50.

The HVAC assembly 20 directs air in opposing directions through each of the first surface 24 and the second surface 26 of housing 178 to accomplish two separate operations. Air is directed through the first surface 24 to the seating assemblies 14 and, consequently, the interior compartment 66 of the vehicle 12. Additionally, the air is directed through the second surface 26 of the housing 178 toward the battery 50 housed in the platform 48. As such, the HVAC assembly 20 operates to cool the passengers in the interior compartment 66 (FIG. 1) and the battery 50 housed below the HVAC assembly 20.

Figure 9:
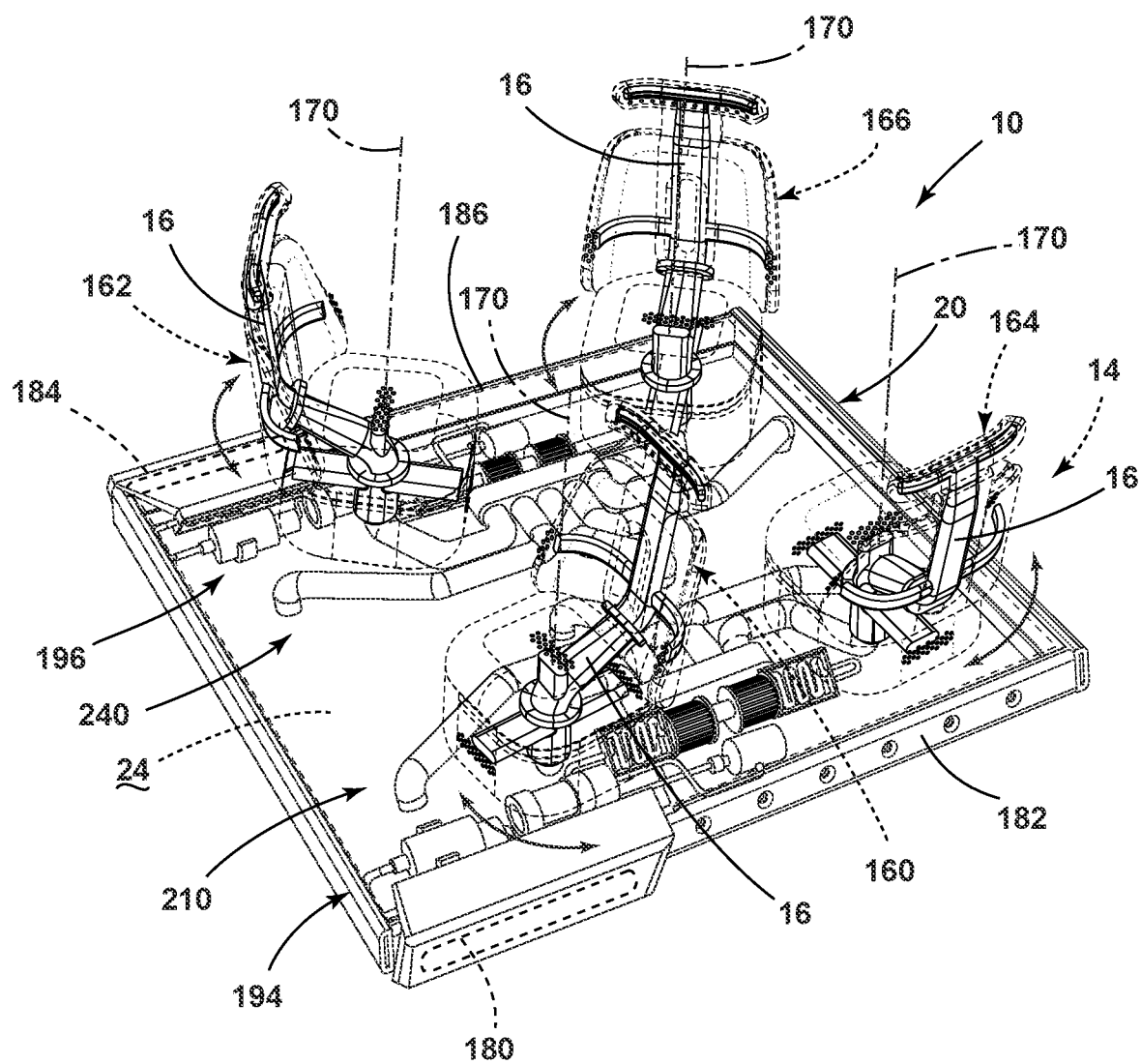
FIG. 9 is a top perspective view of an HVAC unit including seating assemblies disposed on an HVAC assembly, with an upper surface of the HVAC assembly in phantom, according to the present disclosure.

Referring still to FIGS. 7 and 8, as well as to FIG. 9, the seating assemblies 14 are fluidly coupled with the seat-directed ducts 28 disposed of the housing 178. Air is directed through the first intake 180, treated by the HVAC system 194, through the floor duct assembly 210, and through the seating assemblies 162, 166 disposed proximate to the first side 182 of the housing 178. Generally, concurrently, air is directed through the second intake 184, treated by the HVAC system 196, through the floor duct assembly 240, and through the seating assemblies 164, 166 disposed proximate to the second side 186 of the housing 178.

Each seating assembly 14 includes the seat air duct assembly 16 disposed within the interior 18 thereof. The seat air duct assembly 16 provides for heated and cooled seating assemblies 14. The seat air duct assembly 16 rotates with the respective seating assembly 14 about the rotational axis 170. Accordingly, as the seating assembly 14 rotates about the rotational axis 170, the airflow relative to the passenger on the seating assembly 14 remains substantially unchanged.

Figure 10:
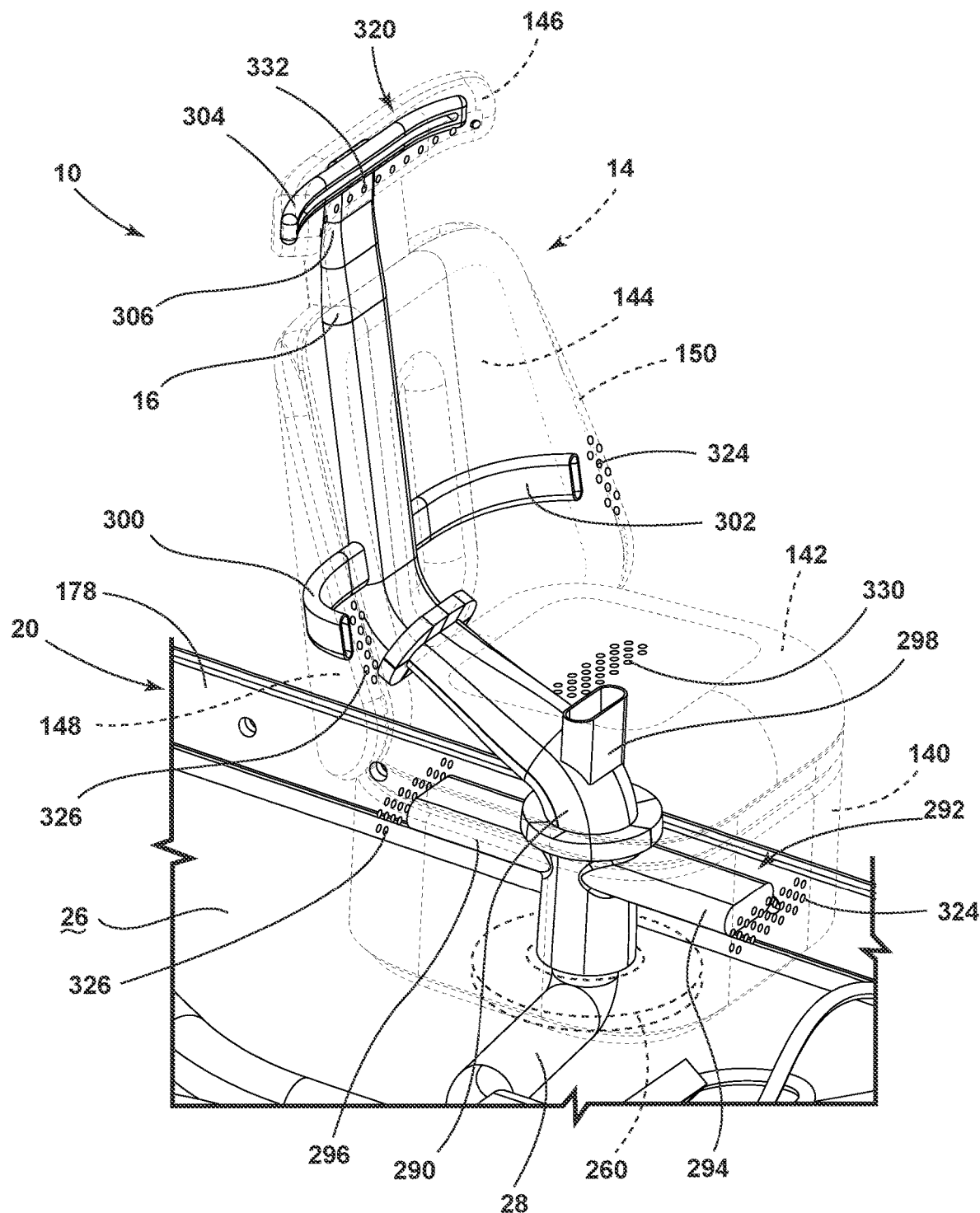
FIG. 10 is a side perspective view of a seating assembly for a vehicle with a seat air duct assembly, according to the present disclosure.

Referring to FIG. 10, each seat air duct assembly 16 includes a central air duct 290 that couples with the respective seat-directed duct 28 and extends through the seating assembly 14. The central air duct 290 extends from proximate to the housing 178 to the headrest 146. The seat air duct assembly 16 includes air duct branches 292 extending therefrom. The air duct branches 292 generally include foot branches 294, 296, a base branch 298, arm branches 300, 302, and a headrest branch 304. Each air duct branch 292 extends from the central air duct 290.

The foot branches 294, 296 are generally disposed within the base support 140 of the seating assembly 14. The foot branch 294 extends from the central air duct 290 in a seat-forward direction and the foot branch 296 extends from the central air duct 290 in a seat-rear direction. The foot branches 294, 296 are illustrated extending from the central air duct 290 at a substantially same height relative to the housing 178, but it is contemplated that the foot branches 294, 296 may extend from the central air duct 290 at different heights without departing from the teachings herein. The base branch 298 is disposed downstream of the foot branches 294, 296. The base branch 298 is disposed within the seat base 142 of the seating assembly. The base branch 298 generally extends vertically upward from the central air duct 290.

The arm branches 300, 302 are generally disposed downstream of the base branches 298. The arm branches 300, 302 extends laterally from the central air duct 290, through the seatback 144, and to the bolsters 148, 150. The arm branch 300 extends from the central air duct 290 in a seat-right direction to the bolster 148, and the arm branch 302 extends from the central air duct 290 extends in a seat-left direction to the bolster 150. The arm branches 300, 302 are illustrated extending from the central air duct 290 at a substantially same height relative to the housing 178, but it is contemplated that the arm branches 300, 302 may extend from the central air duct 290 at different heights without departing from the teachings herein.

The headrest branch 304 is disposed downstream of the arm branches 300, 302. Generally, the headrest branch 304 extends from a distal end 306 of the central air duct 290. The headrest branch 304 extends laterally from the central air duct 290 in each of a seat-right and seat-left direction. The headrest branch 304 extends laterally through the headrest 146.

Figure 11:
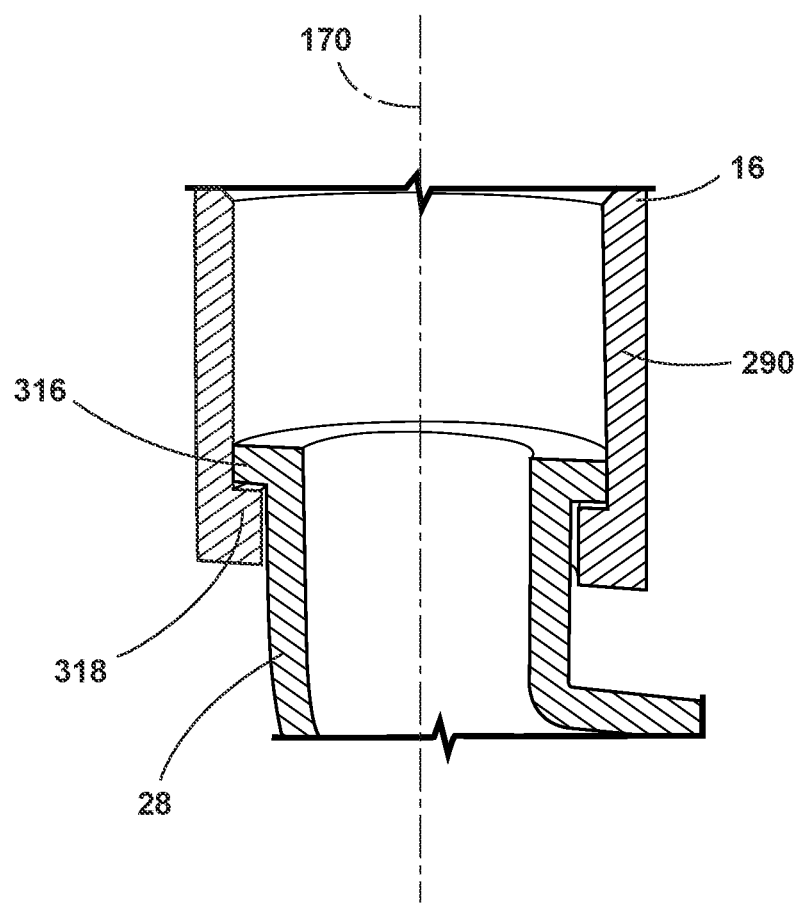
FIG. 11 is a cross-sectional view of an engagement between a seat air duct assembly and a floor duct assembly of an HVAC assembly, according to the present disclosure.

Referring still to FIG. 10, as well as FIG. 11, the central air duct 290 is rotatably coupled to the respective seat-directed duct 28 to allow rotation of the seating assembly 14 and the associated seat air duct assembly 16. At least one of the central air duct 290 and the seat-directed duct 28 extends through the first surface 24 of the housing 178 to form the rotating engagement. Each seat-directed duct 28 include a radial flange 316 that engages a rim 318 of the central air duct 290. The radial flange 316 is disposed within the central air duct 290. The radial flange 316 extends outward and the rim 318 extends inward, thereby retaining the radial flange 316 on the rim 318 and preventing disengagement of the seat-directed duct 28 with the central air duct 290. The radial flange 316 slidably engages the rim 318. The sliding engagement between the radial flange 316 and the rim 318 allows the rotation of the seat air duct assembly 16 about the rotational axis 170.

Figure 12:
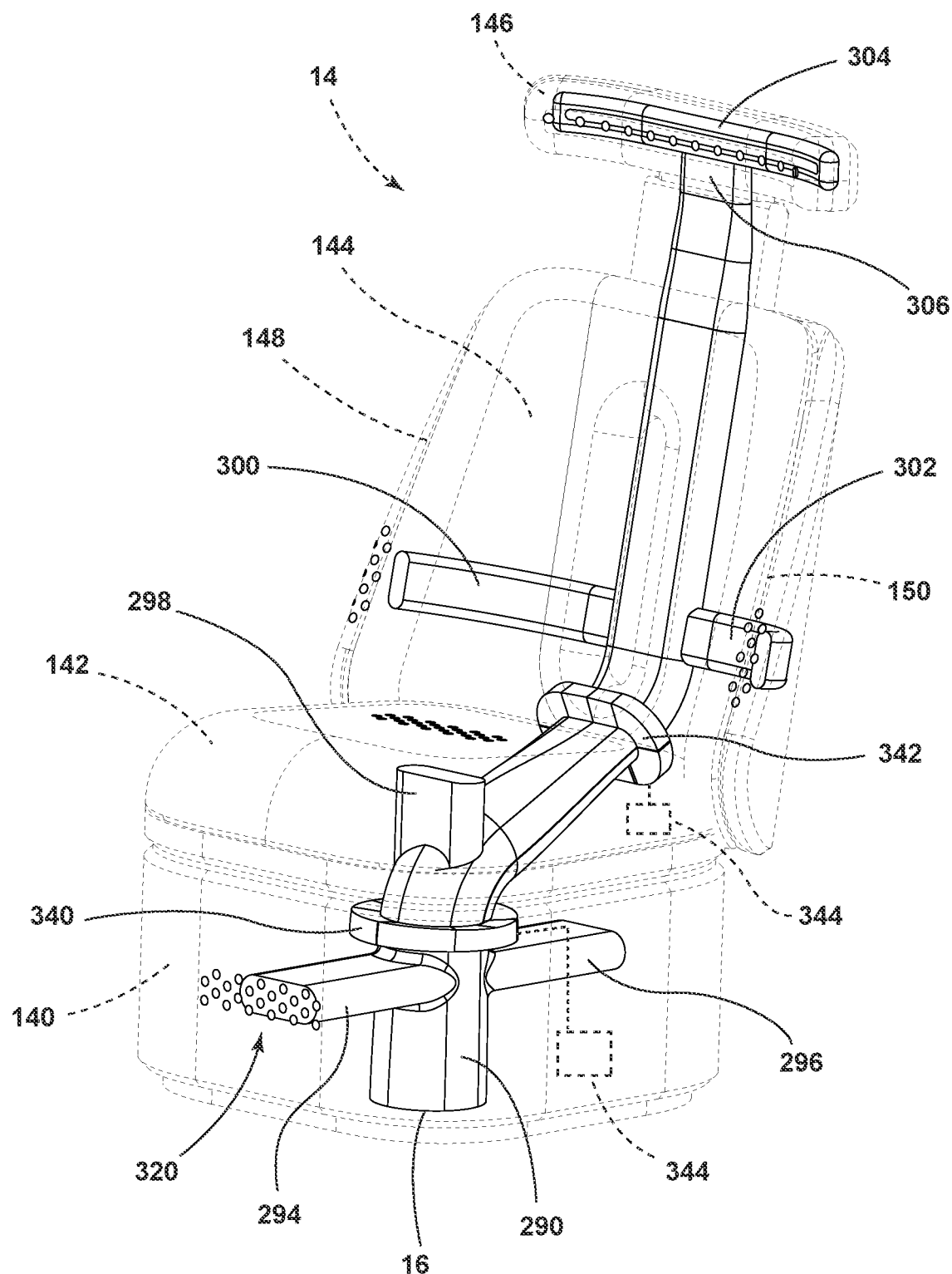
FIG. 12 is a side perspective view of a seating assembly for a vehicle with a seat air duct assembly, according to the present disclosure.
Figure 13A:
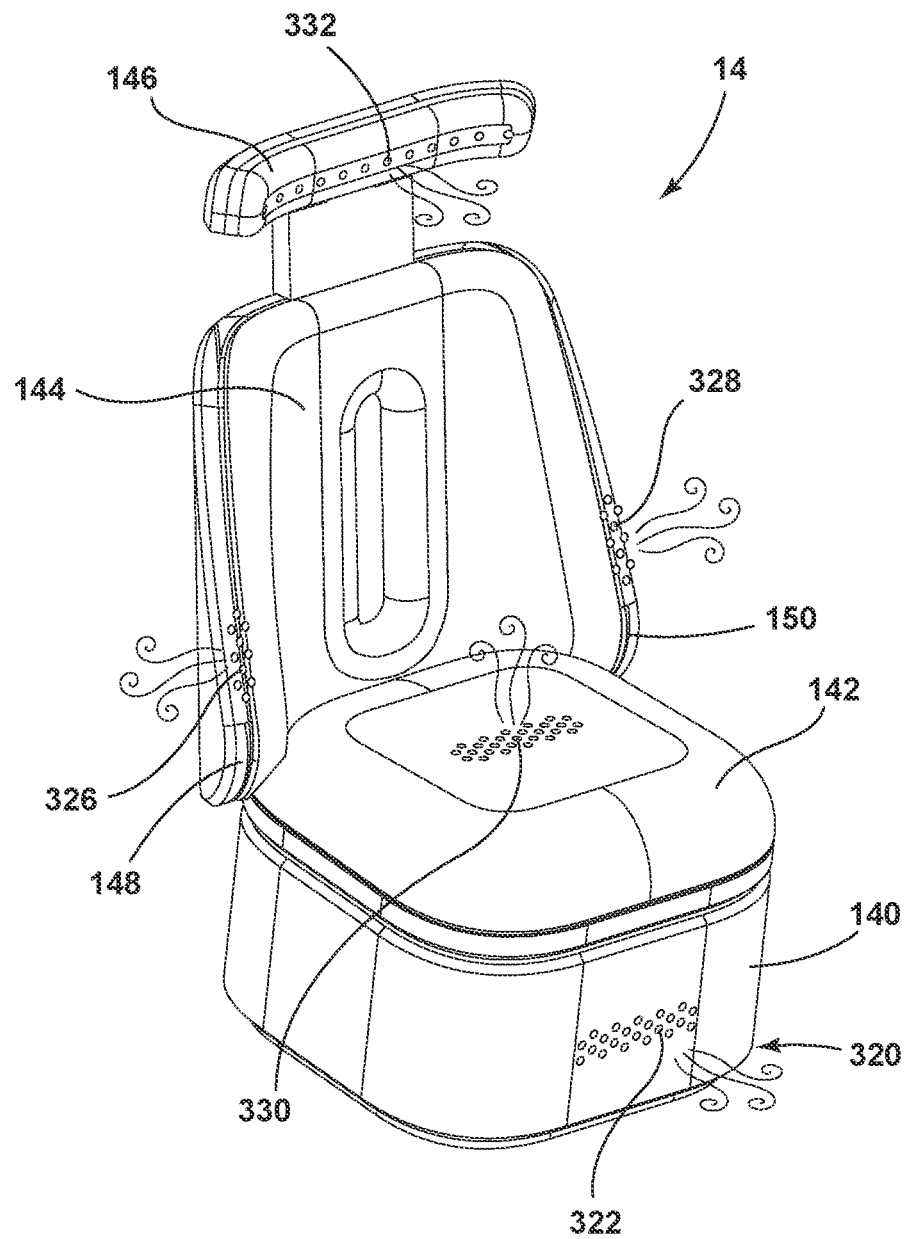
FIG. 13A is a front perspective view of a seating assembly defining air vents, according to the present disclosure.
Figure 13B:
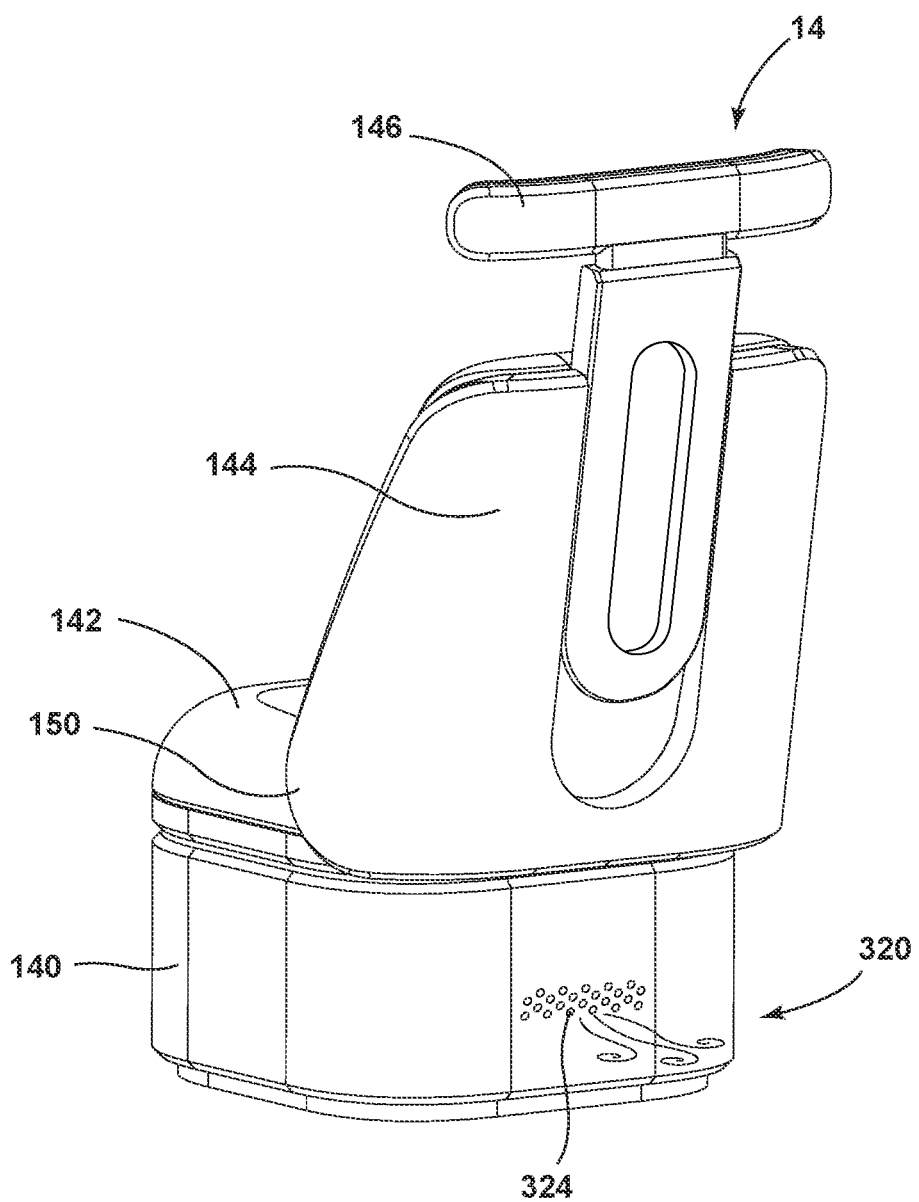
FIG. 13B is a rear perspective view of a seating assembly defining a rear air vent, according to the present disclosure.

Referring to FIGS. 12-13B, each seating assembly 14 defines multiple air vents 320 for expelling air from the seat air duct assembly 16 to the passenger on the seating assembly 14. In the illustrated examples, the multiple air vents 320 include a foot air vent 322, a rear air vent 324, a first arm air vent 326, a second arm air vent 328, a base air vent 330, and a headrest air vent 332. The foot air vent 322 is defined in a seat-forward portion of the base support 140, and the rear air vent 324 is defined in a seat-rear portion of the base support 140. The first arm air vent 326 is defined in the bolster 148, and the second arm air vent 328 is defined in the bolster 150. The base air vent 330 is defined in the seat base 142, and the headrest air vent 332 is defined in the headrest 146.

Generally, the air duct branches 292 align with the air vents 320 to direct air through the air vents 320 to the passenger on or adjacent to the seating assembly 14. The foot branch 294 directs air through the foot air vent 322 to a foot area of the passenger on the seating assembly 14. The foot branch 296 directs air through the rear air vent 324 to a foot area of the passenger in an adjacent seating assembly 14. The base branch 298 directs air through the base air vent 330 to a seat of the passenger on the seating assembly 14. The first arm branch 300 directs air through the arm vent 326 and the second arm branch 302 directs air through the arm vent 328 to provide air toward arm areas of the passenger on the seating assembly 14. The headrest branch 304 directs air through the headrest air vent 332 to direct air to a head area of the passenger on the seating assembly 14. As the seating assembly 14 rotates, the air continues to be expelled in the same areas relative to the passenger as the seat air duct assembly 16 rotates with the seating assembly 14.

Referring still to FIGS. 12-13B, the seat air duct assembly 16 generally includes a first shutoff valve 340 and a second shutoff valve 342. Each shutoff valve 340, 342 operates to close the central air duct 290 and prevent air from being directed further downstream in the central air duct 290. The first shutoff valve 340 is generally disposed downstream of the foot branches 294, 296 and upstream of the base branch 298. Accordingly, air may be directed through the foot air vent 322 and the rear air vent 324, but not through the remainder of the air vents 320 of the seating assembly 14. The second shutoff valve 342 is disposed downstream of the base branch 298 upstream of the arm branches 300, 302. Accordingly, air may be directed through the foot air vent 322, the rear air vent 324, and the base air vent 330, but not the remainder of the air vents 320.

Each shutoff valve 340, 342 is operably coupled with a valve actuator 344 to adjusting the respective shutoff valve 340, 342 between opened and closed positions. In certain aspects, each shutoff valve 340, 342 may be a motorized damper with a rotating flap to open and close the central air duct 290. Each valve actuator 344 may be a plurality of gears, a rack and pinion gear assembly, rails, rotation assemblies, motorized assemblies, or other practicable electromechanical configurations. Each of the shutoff valves 340, 342 may be configured as a sliding or rotating flap or multiple flaps within the central air duct 290 that are adjusted between different positions to open and close the central air duct 290.

Figure 14:
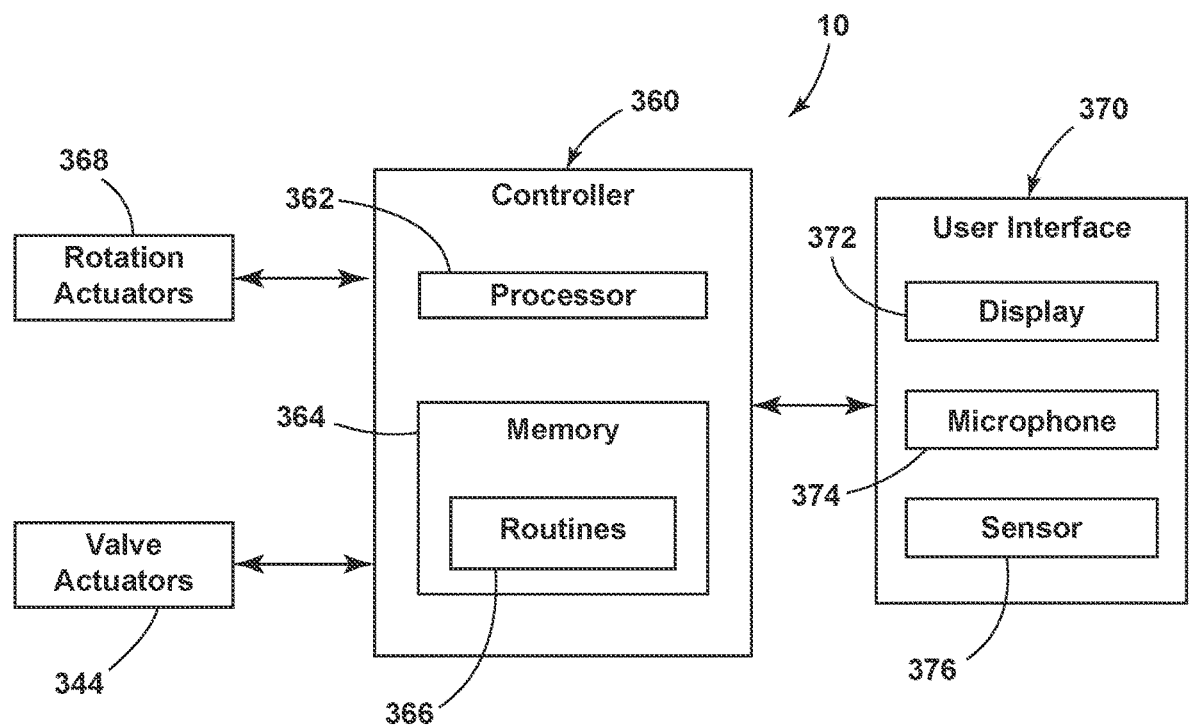
FIG. 14 is a block diagram of an HVAC unit for a vehicle, according to the present disclosure.

Referring to FIG. 14, as well as FIGS. 1-13, the HVAC unit 10 includes a controller 360 for controlling various aspects of the HVAC unit 10. The controller 360 includes a processor 362, a memory 364, and other control circuitry. Instructions or routines 366 are stored in the memory 364 and executable the processor 362. The controller 360 is in communication with the HVAC system 82 or the HVAC systems 194, 196, depending on the configuration of the HVAC assembly 20. The controller 360 activates the HVAC system 82 or the HVAC systems 194, 196 to treat the air entering the HVAC assembly 20. In examples with the dual HVAC system 194, 196, the controller 360 may selectively and independently activate each HVAC system 194, 196.

The controller 360 is also in communication with the valve actuators 344 associated with the first and second shutoff valves 340, 342 to control airflow to the passengers. The controller 360 may selectively and independently activate each valve actuator 344 to provide customizable airflow experiences to passengers in each seating assembly 14.

Additionally, the controller 360 may be in communication with rotation actuators 368 associated with the rotation supports 260 to rotate the seating assemblies 14 to a selected position. Each rotation support 260 is operably coupled with a rotation actuator 368 for rotating the rotation support 260 relative to the rotational axis 170. The rotation actuators 368 may be disposed within HVAC assembly 20 and substantially obscured from the view of the passengers. The rotation actuators 368 may be motorized turntables, motorized rail assemblies, rotary actuators, gear assemblies, or other practicable configurations. Each rotation support 260 may be independently rotated about the respective rotational axis 170 to selectively and independently rotate the seating assemblies 14.

The controller 360 may be in communication with a user interface 370 that receives an input from the passenger or other user. The user interface 370 may include a display 372, microphone 374, a sensor 376, or a combination thereof to receive the input. Depending on the configuration of the user interface 370, the user interface 370 may receive touch inputs on the display 372, voice commands through the microphone 374, and/or sense a gesture with the sensor 376. The user interface 370 receives the input and communicates the input to the controller 360. The controller 360 may subsequently control various aspects of the HVAC unit 10 in response to the input, including, but not limited to, an airflow path through each seat air duct assembly 16 and a position of each seating assembly 14.

Use of the present device may provide for a variety of advantages. For example, the HVAC assembly 20 is disposed on the platform 48, thereby providing additional space within the interior compartment 66 of the vehicle 12. Additionally, the HVAC assembly 20 is a self-contained module that may be used with various configurations of the vehicle body 46. Also, the HVAC assembly 20 may direct air into each seating assembly 14. Further, the HVAC assembly 20 may direct air into each seating assembly 14, as well as to the battery 50 within the platform 48. Moreover, the first and second shutoff valves 340, 342 may be independently operated to open and close portions of the central air duct 290 of each seating assembly 14. Additionally, the seat air duct assembly 16 rotates with the corresponding seating assemblies 14 and provides a substantially similar HVAC experience to the passenger on the seating assembly 14 in various positions the seating assembly 14 about the rotational axis 170. Moreover, the seat air duct assembly 16 rotating with the seating assembly 14 provides greater flexibility for the seating assembly 14 without affecting the airflow provided to the passenger. Also, the configuration and positioning of the HVAC assembly 20 may improve the experience of the passenger within the vehicle 12. Moreover, in BEV examples, the positioning of the HVAC assembly 20 provides space for more dynamic interiors where the HVAC assembly 20 is not utilized for cooling an internal combustion engine. Additional benefits or advantages may be realized and/or achieved.

According to various examples, a vehicle heating, ventilation, and air conditioning unit includes a seating assembly that has a seat air duct assembly disposed within an interior of the seating assembly. A heating, ventilation, and air conditioning assembly including a housing having a first surface and a second surface. The seating assembly is disposed on the first surface of the housing. A seat-directed duct is disposed within the housing. The seat-directed duct is in fluid communication with the seat air duct assembly and an intake defined by the housing. A condenser is disposed within the housing proximate to the intake and an evaporator is disposed within the housing proximate to an inlet of the seat-directed duct.

Embodiments of the present disclosure may include one or a combination of the following features:
- a blower motor disposed in the housing proximate to the inlet of the seat-directed duct, wherein the blower motor is configured to direct air through the inlet of the seat-directed duct;
- a battery-directed duct disposed within the housing, wherein the battery-directed duct defines an outlet in fluid communication with a vent opening defined by the second surface of the housing to direct air toward a battery;
- a platform housing the battery, wherein the heating, ventilation, and air conditioning assembly is disposed on the platform;
- a duct connector disposed within the housing, wherein each of the seat-directed duct and the battery-directed duct are coupled to the duct connector, and wherein the duct connector is disposed proximate to the evaporator;
- the seat air duct assembly includes a central air duct extending from proximate to the first surface of the housing to proximate a headrest of the seating assembly; and
- the central air duct is rotatably coupled to the seat-directed duct to allow the seating assembly to rotate relative to the housing.

According to various examples, a heating, ventilation, and air conditioning unit for a vehicle includes a heating, ventilation, and air conditioning assembly includes a housing defining an intake. The housing has a first surface and a second surface opposing the first surface. A floor duct assembly is disposed within the housing. The floor duct assembly includes at least one seat-directed duct. A blower motor is disposed proximate to an inlet of the at least one seat-directed duct. The blower motor is configured to direct air through the inlet. At least one seating assembly is operably coupled to the first surface of the housing. The at least one seating assembly defines at least one air vent. The at least one seating assembly includes a seat air duct assembly in fluid communication with the floor duct assembly to direct air through the at least one air vent.

Embodiments of the present disclosure may include one or a combination of the following features:
- the at least one seating assembly includes a first seating assembly and a second seating assembly, wherein the at least one seat-directed duct includes a first seat-directed duct fluidly coupled to the first seating assembly and a second seat-directed duct fluidly coupled to the second seating assembly;
- the at least one air vent includes multiple air vents defined by the at least one seating assembly, wherein the seat air duct assembly includes a central air duct and air duct branches extending from the central air duct, and wherein each air duct branch directs air from the central air duct to at least one of the multiple air vents;
- the multiple air vents include a foot air vent, an arm air vent, a seat base air vent, and a headrest air vent;
- the seat air duct assembly includes a shutoff valve for selectively opening and closing the seat air duct assembly;
- a rotation support disposed at least partially within the housing and operably coupled to the at least one seating assembly, wherein the rotation support is configured to rotate the at least one seating assembly about a rotational axis;
- the at least one seat-directed duct of the floor duct assembly extends through the rotation support to couple with the seat air duct assembly; and
- the floor duct assembly includes a battery-directed duct, wherein the battery-directed duct directs air through a vent opening defined in the second surface of the housing toward a battery.

According to various examples, a heating, ventilation, and air conditioning assembly for a vehicle includes a housing that defines an interior. The housing defines an intake fluidly coupled with the interior. The housing defines a first vent opening on a first surface thereof and a second vent opening on a second surface thereof. A floor duct assembly is disposed within the interior of the housing. The floor duct assembly includes a battery-directed duct in fluid communication with the intake and the first vent opening. The battery-directed duct is configured to direct air toward a battery. A seat-directed duct is in fluid communication with the intake and the second vent opening. The seat-directed duct is configured to direct air toward a seating assembly.

Embodiments of the present disclosure may include one or a combination of the following features:
- a heating, ventilation, and air conditioning system disposed within the interior of the housing, wherein the heating, ventilation, and air conditioning system is in fluid communication with the intake and the floor duct assembly;
- a rotation support operably coupled to the seating assembly, and wherein the seating assembly is rotatable relative to the housing via the rotation support;
- a platform housing the battery, wherein the housing is disposed on the platform;
- a duct connector coupled to the battery-directed duct and the seat-directed duct; and
- a blower motor disposed proximate to the duct connector to direct air from the intake into each of the battery-directed duct and the seat-directed duct.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

The various illustrative logical blocks, modules, controllers, and circuits described in connection with the embodiments disclosed herein may be implemented or performed with application specific integrated circuits (ASICs), field programmable gate arrays (FPGAs), general purpose processors, digital signal processors (DSPs) or other logic devices, discrete gates or transistor logic, discrete hardware components, or any combination thereof designed to perform the functions described herein. A general purpose processor may be any conventional processor, controller, microcontroller, state machine, or the like. A processor may also be implemented as a combination of computing devices, e.g., a combination of a DSP and a microprocessor, a plurality of microprocessors, one or more microprocessors in conjunction with a DSP core, or any other such configuration.

It is also important to note that the construction and arrangement of the elements of the invention as shown in the exemplary examples is illustrative only. Although only a few examples of the present innovations have been described in detail in this disclosure, those skilled in the art who review this disclosure will readily appreciate that many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connectors or other elements of the system may be varied, the nature or number of adjustment positions provided between the elements may be varied. It should be noted that the elements and/or assemblies of the system might be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary examples without departing from the spirit of the present innovations.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A vehicle heating, ventilation, and air conditioning unit, comprising:
   a seating assembly including a seat air duct assembly disposed within an interior of the seating assembly, the seat air duct assembly including:
      a central air duct;
      a base branch extending from the central air duct, the base branch being configured to direct air to a seat base of the seating assembly;
      foot branches extending outward from the central air duct, the foot branches being upstream of the base branch and configured to direct air to sides of a base support of the seating assembly;
      a first arm branch extending outward from the central air duct and toward a first bolster of the seating assembly, the first arm branch being downstream of the base branch;
      a second arm branch extending outward from the central air duct and towards a second bolster of the seating assembly, the second arm branch being downstream of the base branch and opposing the first arm branch; and
      a headrest branch downstream of the first arm branch and the second arm branch, the headrest branch being configured to direct air along a headrest of the seating assembly; and
   a heating, ventilation, and air conditioning assembly including:
      a housing having a first surface and a second surface, wherein the seating assembly is disposed on the first surface of the housing; and
      a seat-directed duct disposed within the housing, wherein the seat-directed duct is in fluid communication with the central air duct and an intake defined by the housing, wherein the central air duct is rotatably coupled to the seat-directed duct, and wherein the central air duct extends from the seat-directed duct to the headrest.

2. The vehicle heating, ventilation, and air conditioning unit of claim 1, wherein the foot branches include a first foot branch extending in a seat-forward direction and a second foot branch extending in a seat-rearward direction, and wherein the base branch extends upward from the central air duct.

3. The vehicle heating, ventilation, and air conditioning unit of claim 1, further comprising:
   a foot air vent defined in a seat-forward portion of the base support of the seating assembly;
   a rear air vent defined in a seat-rearward portion of the base support;
   arm air vents defined on opposing bolsters of the seating assembly; and
   a headrest air vent defined on the headrest, the headrest air vent downstream of the arm air vents.

4. The vehicle heating, ventilation, and air conditioning unit of claim 3, wherein the foot branches direct air through the foot air vent and the rear air vent, and wherein the first arm branch and the second arm branch direct air through the arm air vents.

5. The vehicle heating, ventilation, and air conditioning unit of claim 1, further comprising:
   a base air vent defined in the seat base, wherein the base branch is configured to direct air through the base air vent.

6. The vehicle heating, ventilation, and air conditioning unit of claim 1, wherein the headrest branch extends laterally from a distal end of the central air duct.

7. The vehicle heating, ventilation, and air conditioning unit of claim 1, further comprising:
a first shutoff valve coupled to the central air duct, the first shutoff valve being upstream of the base branch.

8. The vehicle heating, ventilation, and air conditioning unit of claim 7, further comprising:
a second shutoff valve coupled to the central air duct, the second shutoff valve being upstream of the first arm branch and the second arm branch.

9. A vehicle heating, ventilation, and air conditioning unit, comprising:
a seating assembly including a seat air duct assembly disposed within an interior of the seating assembly, the seat air duct assembly including a central air duct, wherein the seat air duct assembly is in fluid communication with:
a foot air vent defined in a seat-forward portion of a base support of the seating assembly;
a rear air vent defined in a seat-rearward portion of the base support;
arm air vents defined on opposing bolsters of the seating assembly; and
a headrest air vent defined on a headrest of the seating assembly, the headrest air vent downstream of the arm air vents; and
a heating, ventilation, and air conditioning assembly including:
a housing having a first surface and a second surface, wherein the seating assembly is disposed on the first surface of the housing; and
a seat-directed duct disposed within the housing, wherein the seat-directed duct is in fluid communication with the central air duct and an intake defined by the housing, wherein the central air duct is rotatably coupled to the seat-directed duct, and wherein the central air duct extends from the seat-directed duct to the headrest.

10. The vehicle heating, ventilation, and air conditioning unit of claim 9, further comprising:
a base air vent defined on a seat base of the seating assembly, the base air vent being downstream of the foot air vent and the rear air vent.

11. The vehicle heating, ventilation, and air conditioning unit of claim 10, further comprising:
a first shutoff valve coupled to the central air duct, the first shutoff valve being downstream of the foot air vent and the rear air vent; and
a second shutoff valve coupled to the central air duct, the second shutoff valve being downstream of the base air vent.

12. The vehicle heating, ventilation, and air conditioning unit of claim 9, further comprising:
at least one air duct branch that extends from the central air duct and to at least one of the foot air vent, the rear air vent, the arm air vents, and the headrest air vent.

13. The vehicle heating, ventilation, and air conditioning unit of claim 12, wherein the at least one air duct branch includes:
a base branch extending from the central air duct, the base branch configured to direct air to a seat base of the seating assembly;
a first arm branch extending outward from the central air duct and downstream of the base branch; and
a second arm branch extending outward from the central air duct and downstream of the base branch, the second arm branch opposing the first arm branch, wherein the first and second arm branches are configured to direct air to the arm air vents.

14. The vehicle heating, ventilation, and air conditioning unit of claim 13, wherein the base branch extends upward from the central air duct, and wherein the first arm branch and the second arm branch extend perpendicular to the base branch.

15. The vehicle heating, ventilation, and air conditioning unit of claim 13, wherein the first arm branch extends to a first bolster of the seating assembly and the second arm branch extends to a second bolster of the seating assembly.

16. A vehicle heating, ventilation, and air conditioning unit, comprising:
a heating, ventilation, and air conditioning assembly including:
a housing defining an intake, wherein the housing has a first surface and a second surface opposing the first surface;
a floor duct assembly disposed within the interior of the housing, wherein the floor duct assembly includes:
a duct connector having a receiving side defining an opening to receive air from the intake and an outlet side opposing the receiving side;
outer seat-directed ducts coupled to opposing ends of the outlet side of the duct connector, the outer seat-directed ducts being in fluid communication with the intake and defining outer vent openings; and
inner seat-directed ducts coupled to the outlet side of the duct connector, the inner seat-directed ducts being disposed between the outer seat-directed ducts, and wherein the inner seat-directed ducts are in fluid communication with the intake and define inner vent openings;
a blower motor disposed proximate to inlets of the outer seat-directed ducts and the inner seat-directed ducts, wherein the blower motor is configured to direct air through the inlets;
a first row of seating assemblies operably coupled to the first surface of the housing, wherein the first row of seating assemblies each define at least one air vent and include a seat air duct assembly that is in fluid communication with the outer seat-directed ducts, respectively, to direct air through the at least one air vent; and
a second row of seating assemblies operably coupled to the first surface of the housing and disposed rearward of the first row of seating assemblies, wherein the second row of seating assemblies each define at least one air vent and include a seat air duct assembly that is in fluid communication with the inner seat-directed ducts, respectively, to direct air through the at least one air vent.

17. The vehicle heating, ventilation, and air conditioning unit of claim 16, wherein the outer seat-directed ducts include a first seat-directed duct and a second seat-directed duct opposing the first seat-directed duct, and wherein the inner seat-directed ducts include a third seat-directed duct and a fourth seat-directed duct.

18. The vehicle heating, ventilation, and air conditioning unit of claim 17, wherein the first row of seating assemblies includes a first seating assembly in fluid communication with the first seat-directed duct and a second seating assembly in fluid communication with the second seat-directed duct, and wherein the second row of seating assemblies includes a third seating assembly in fluid communication with the third seat-directed duct and a fourth seating assembly in fluid communication with the fourth seat-directed duct.

19. The vehicle heating, ventilation, and air conditioning unit of claim 16, further comprising:
- a first row of rotation supports disposed at least partially within the housing and operably coupled to the first row of seating assemblies, respectively, wherein the first row of rotation supports are configured to rotate the first row of seating assemblies about respective rotational axes; and
- a second row of rotation supports disposed at least partially within the housing and operably coupled to the second row of seating assemblies, respectively, wherein the second row of rotation supports are configured to rotate the second row of seating assemblies about respective rotational axes.

\* \* \* \* \*